United States Patent [19]
Medlar

[11] 3,758,839
[45] Sept. 11, 1973

[54] CURRENT AND VOLTAGE CONTROLLED BATTERY CHARGER
[75] Inventor: Lewis A. Medlar, Oreland, Pa.
[73] Assignee: Fox Products Company, Philadelphia, Pa.
[22] Filed: Oct. 4, 1971
[21] Appl. No.: 186,354

Related U.S. Application Data
[63] Continuation of Ser. No. 768,684, Oct. 18, 1968.

[52] U.S. Cl.................... 320/32, 320/39, 320/23
[51] Int. Cl. ............................................ H02j 7/04
[58] Field of Search .................. 320/39, 40, 32, 33, 320/23

[56] References Cited
UNITED STATES PATENTS
3,517,295  1/1970  Lapuyade ..................... 320/39 X
FOREIGN PATENTS OR APPLICATIONS
1,313,915  11/1962  France Primary Examiner—J. D. Miller
Assistant Examiner—Robert J. Hickey
Attorney—Roylance, Abrams, Berdo & Kaul

[57] ABSTRACT

Battery charging method and apparatus for performing the method including a controlled rectifier and a trigger circuit in which a current transformer senses charging current, a voltage divider senses battery terminal voltage, and signals developed from both of the current and voltage sensing devices are used to control the operation of the trigger circuit. Current control is maintained during initial portion of the charging cycle with voltage control being substituted to diminish charging current after which a second current control maintains a closely controlled "trickle" charge level. The three control modes operate sequentially, all use the same common reference value and all control the same charging circuit valve. A second embodiment of the apparatus uses two controlled rectifiers, fired alternately.

7 Claims, 3 Drawing Figures

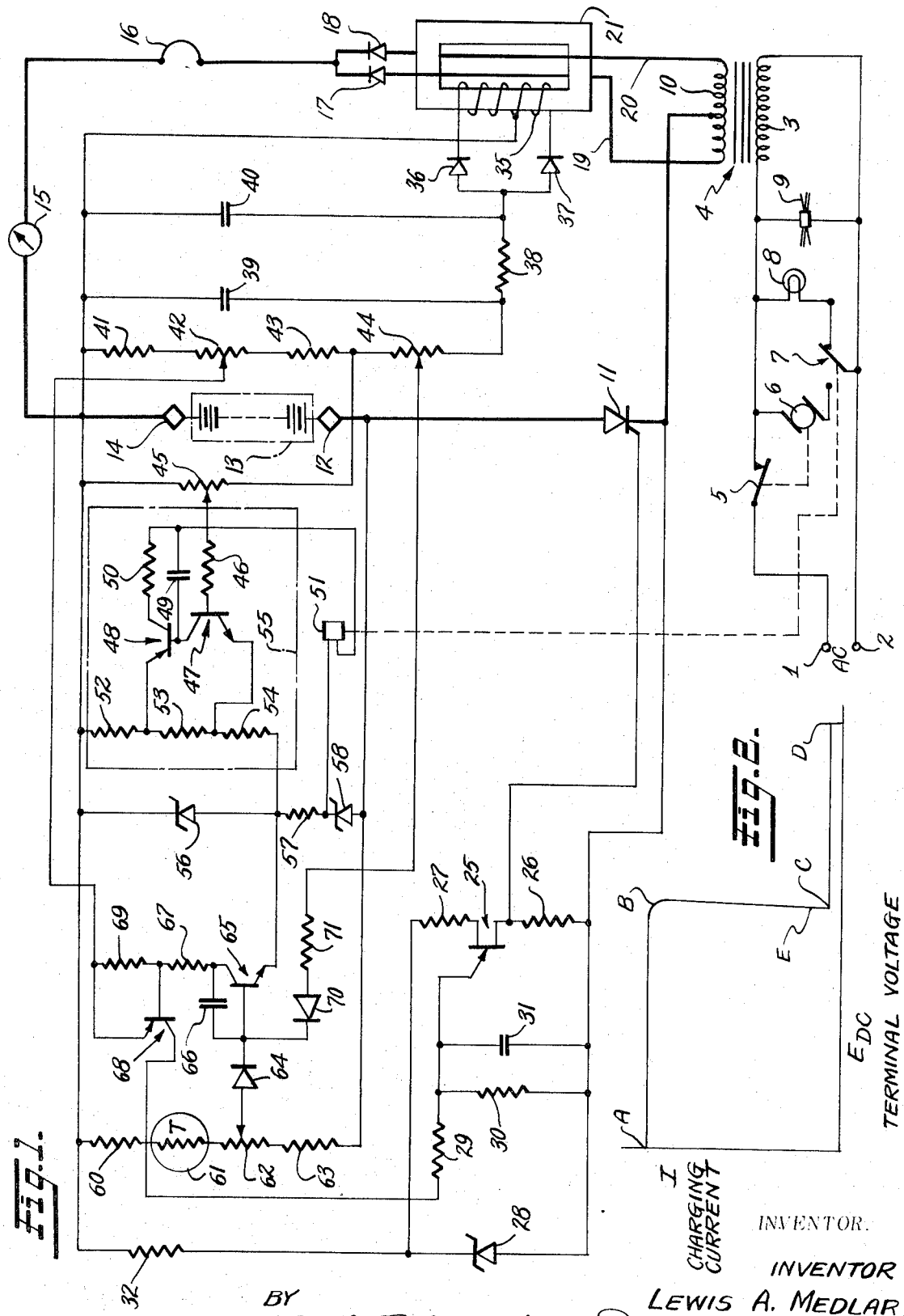

PATENTED SEP 11 1973 3,758,839

INVENTOR.
LEWIS A. MEDLAR
BY
Arnold, Roylance, Kruger & Durkee
ATTORNEYS

CURRENT AND VOLTAGE CONTROLLED BATTERY CHARGER

This is a continuation of application Ser. No. 768,684 filed Oct. 18, 1968 now abandoned.

This invention relates to battery charging apparatus, and more specifically to a method and apparatus for charging one or more electric storage batteries with a controlled current-voltage profile.

The fundamental problem of storing energy in an electrochemical cell is, fundamentally, one of passing a suitable charging current through the cell in the proper direction to reverse the chemical reaction therein. Many prior art workers have attacked this problem with varying degrees of success. Since the advent of the controlled rectifier, and especially since the development of relatively large capacity controlled rectifiers, a new genus of battery chargers has evolved. The controlled rectifier lends itself well to battery charging problems because the ampere-time product of the charge supplied can be accurately controlled by rendering the controlled rectifier conductive at a precisely controllable point in each cycle of the full-wave or half-wave rectified supply current.

However, along with the advantages a number of disadvantages and problems have appeared in controlled rectifier circuits, primarily the problems of protecting the controlled rectifier from excessive currents which would render even the larger controlled rectifiers useless. This is especially true when the charger is connected to a fully discharged battery or is short circuited. There are, of course, practical limits in cost, size and availability to the current capacity of the controlled rectifier to be used.

In addition, the use of a controlled rectifier in a battery charging circuit presents the challenges of developing a circuit which can control the rectifier in various modes to automatically provide charging current to the battery at different levels in the same charging cycle.

An object of the present invention is to provide a battery charging circuit using a controlled rectifier in which the charging current is limited to safe levels.

Another object is to provide a method of charging a battery in which three types or forms of control are provided in sequence, the three types being high current, voltage and low current.

Another object is to provide a charging circuit in which a controlled rectifier is rendered conductive by trigger pulses from a control circuit which responds to both battery charging current and battery terminal voltage.

Yet another object is to provide a charging circuit in which the charge current profile follows a preselected pattern which adapts itself to the needs of an individual battery or group of batteries.

A further object is to provide an apparatus in which charging current is directly sensed and is used to limit the ampere-time product which the controlled rectifier is allowed to provide to the battery.

A still further object is to provide a battery charging apparatus in which relatively independent controls operate sequentially to control high charging current, terminal voltage and low charging current, respectively, and wherein the controls use a common reference value and operate on the same thyristor path.

Briefly described, the invention includes a method of providing controlled charging current to a battery. Three distinct types, or modes, and periods of control are provided. Each type of control is mutually contradictory to the other two, yet each type dominates during its portion of the charging sequence without conflict from the other controls. The three controls all operate from a common reference value and all control via the same element.

The invention also includes a novel apparatus having semiconductor control and sensing elements. The control systems provide a first period wherein the charging current is held constant while the battery terminal voltage rises to a predetermined voltage level. The second control period begins when that predetermined voltage is attained. The second control system maintains the voltage level constant while the charging current diminishes to a predetermined lower level. The third control system maintains the charging current constant at the lower level for the remainder of the charge. The transfer of control dominance from system to system is accomplished without mechanical switching or timers.

In order that the manner in which the foregoing and other objects are attained in accordance with the invention can be understood in detail, a particularly advantageous embodiment thereof will be described with reference to the accompanying drawings, which form a part of the specification, and wherein:

FIG. 1 is a schematic diagram of one embodiment of an apparatus in accordance with the invention;

FIG. 2 is a current-voltage curve showing a typical profile of the charging pattern which can be accomplished with the apparatus of FIG. 1.

Figure 3:
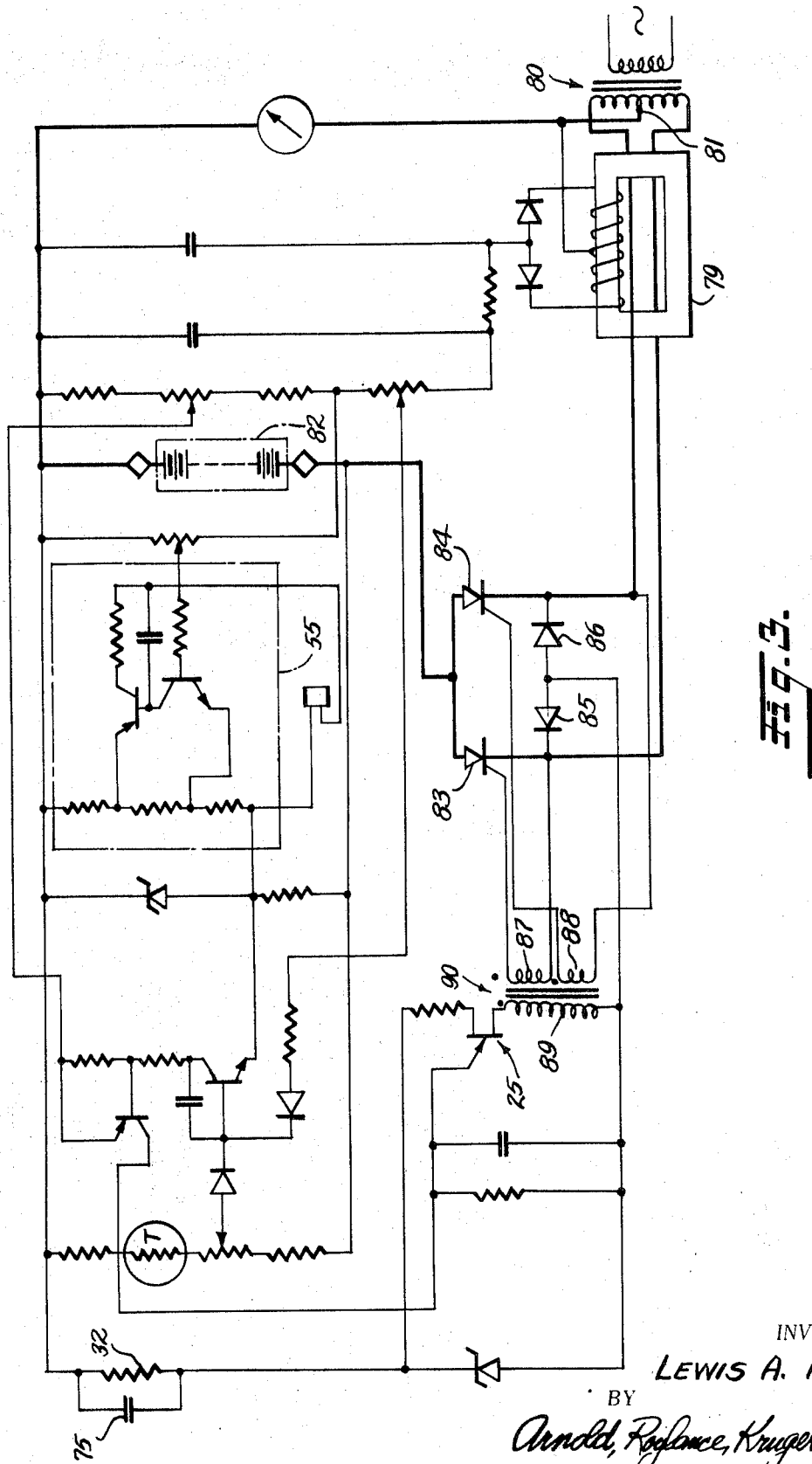
FIG. 3 is a schematic diagram of another embodiment of an apparatus in accordance with the invention.

Referring now to FIG. 1, a source of AC voltage is connected to the power input portion of the circuit at terminals 1 and 2, the terminals being connected to the primary winding 3 of a conventional power transformer indicated generally at 4. The circuit portion between terminal 1 and winding 3 includes a normally closed switch 5 which is actuated by a timer motor 6. The timer motor serves the function of terminating the charging process a preselected period of time after the charging process has progressed through a portion of its cycle as will be described hereinafter. Timer motor 6 is connected across the AC line on the primary side and is energized by a single-pole, double-throw contact set indicated generally at 7. In the position of contact set 7 wherein the timer motor is not energized, the contact set provides a complete circuit for an indicator lamp 8 which is connected across the AC supply and which is included to indicate to an operator that the apparatus is in the early phases of the charging cycle. A fan 9 is also connected across the AC power source to provide cooling for various components in the apparatus.

A secondary winding 10 of transformer 4 includes two end terminals and a center tap, the center tap being connected to the cathode of a conventional controlled rectifier 11. The anode of rectifier 11 is connected to a suitable connector device 12, such as a conventional battery clamp, which can be attached to the negative terminal of the battery or batteries 13 to be charged. The positive terminal of the battery is connected to a similar connector 14 which is connected through a conventional ammeter 15 and circuit breaker 16 to the cathode electrodes of two rectifiers 17 and 18. The anode electrode of rectifier 17 is connected via a conductor 19 to one end terminal of secondary winding 10 of transformer 4. The anode electrode of diode 18 is similarly connected via a conductor 20 to the other end terminal of secondary winding 10.

As schematically shown in FIG. 1, conductors 19 and 20 pass through and are inductively coupled to a permeable core 21 which is designed to develop flux with relatively low magnetomotive force and to saturate at low levels of current carried by conductors 19 and 20. It will be seen from FIG. 1 that conductors 19 and 20 pass through core 21 in opposite directions so that the magnetomotive force (MMF) produced in core 21 by the current through conductor 19 and the MMF produced by the current flowing in conductor 20 are effective to reconstruct an AC signal in a secondary winding 35. Winding 35 is a center-tapped winding on core 21 and is connected to control circuitry to be described hereafter. Because of rectifiers 17 and 18, the currents flowing in conductors 19 and 20 are pulsating DC and are 180° out of phase because they are connected to the end terminals of a center-tapped secondary winding.

The unidirectional pulsating current in conductor 19 produces an MMF in one direction during one half cycle of the AC appearing in secondary winding 10. The current in conductor 20 produces an MMF in the other direction during the other half cycle. To secondary winding 35, this alternating force appears to be the result of an AC signal applied to a primary winding and an AC signal is developed in winding 35. The difference between the MMF's in core 21 produce current in winding 35 representative of the magnitude of the total charging current flowing through conductors 19 and 20.

The alternating current from the secondary winding is rectified by diodes 17 and 18 and provided to the battery whenever controlled rectifier 11 is rendered conductive. The gate electrode of rectifier 11 is connected to the base 1 electrode of a conventional unijunction trasistor (UJT) indicated generally at 25. A resistor 26 is connected between the base 1 electrode and ground. The base 2 electrode is connected through a resistor 27 to the cathode electrode of a conventional Zener diode 28, the anode electrode of which is connected to ground. The cathode electrode of diode 28 is also connected through a resistor 32 to positive battery connector 14.

The emitter electrode of UJT 25 is connected to one terminal of a resistor 29, to one terminal of a resistor 30 and to one terminal of a capacitor 31. The other terminals of resistor 30 and capacitor 31 are connected to ground and the other terminal of resistor 29 is connected to a source of charging current for capacitor 31, to be described hereafter. Resistor 29 and capacitor 31 form an RC timing circuit for UJT 25 in a manner which is well known in the art.

Secondary winding 35 is wound around core 21 and is provided with two end terminals and a center tap, the center tap being connected to connector 14 at the positive battery terminal. One end terminal is connected to the cathode electrode of a conventional semiconductor diode 36 and the other end terminal is connected to the cathode electrode of a conventional diode 37. The anode electrodes of the two diodes are connected to each other and to a conventional filter circuit including a series resistor 38 and two capacitors 39 and 40 which are connected between the two ends of resistor 38 and the positive battery and charger terminal. A voltage divider circuit is connected between the output of the filter circuit and the center tap of winding 35, the voltage divider including a fixed resistor 41, the resistance element of a potentiometer 42, a fixed resistor 43 and the resistance element of a potentiometer 44. As will be recognized by those skilled in the art, the flux generated in core 21 by the charging current produces a current in winding 35 which is rectified by diodes 36 and 37, filtered, and conducted through the four resistors in the voltage divider, producing voltages at various points in the divider, the variations in each of which is representative of changes in magnitude of charging current. The resistance element of a potentiometer 45 is connected in parallel circuit relationship with resistors 41 and 43 and with the resistance element of potentiometer 42 to provide an additional point at which a signal representative of charging current can be obtained. The movable contact of potentiometer 45 is connected through a fixed resistor 46 to the base electrode of a conventional NPN transistor indicated generally at 47. The collector electrode of transistor 47 is connected to the base electrode of a conventional PNP transistor indicated generally at 48. A capacitor 49 is connected between the collector electrode of transistor 47 and one terminal of a fixed resistor 50 which is also connected to one terminal of the energizing winding of an electromagnetic relay 51. The other terminal of resistor 50 is connected to the collector electrode of transistor 48, the emitter electrode of which is connected to the junction between a fixed resistor 52 and a fixed resistor 53 which are connected in series circuit relationship with a fixed resistor 54 between the positive battery and charger terminal and a reference voltage circuit. The emitter electrode of transistor 47 is connected at the junction between resistors 53 and 54.

Transistors and 48 and the associated circuitry described above constitute a current level sensing circuit 55, the purpose of which is to respond to a preselected level of diminishing charging current, as represented by the voltage at the movable contactor of potentiometer 45, and to provide energizing current to relay 51 when that current level is reached. Energization of relay 51 then moves the movable contact of contact set 7 from the position shown in FIG. 1 to the position in which the timer motor is energized. The timer then begins toooperate and, after the selected time period for which the timer is designed, contact 5 is opened, deenergizing the entire apparatus.

The cathode electrode of a Zener diode 56 is connected to the positive battery terminal and charger connector 14. The anode electrode of diode 56 is connected to one terminal of a fixed resistor 57, the other terminal of which is connected to the other terminal of relay 51 and to the cathode electrode of a Zener diode 58. The junction between diode 56 and resistor 57 is connected to the other end of the series circuit including resistors 52, 53 and 54.

The series circuit including Zener diodes 56 and 58 and resistor 57 forms one leg of a bridge circuit which is connected in parallel circuit relationship with the battery when a battery is attached to connectors 12 and 14. The other leg of the bridge is formed by a series circuit including fixed resistors 60, 61, 62 and 63. Resistor 61 is a positive temperature coefficient resistor made of, for example, nickel, and is selected to compensate the operation of the bridge circuit for ambient temperature conditions. Resistor 62 is the resistance element of a potentiometer, the movable contact of which is connected through a diode 64 to the base electrode of a conventional NPN transistor indicated generally at 65. The emitter electrode of transistor 65 is connected to the junction between diode 56 and resistor 57 in the opposite leg of the bridge. Thus, the base-emitter circuit of transistor 65 and diode 64 are connected across the two corners of the bridge to detect an unbalance between these two points, the movable contact of potentiometer 62 constituting the corner of the bridge in the leg including the four series resistors.

A capacitor 66 is connected between the base electrode and the collector electrode of transistor 65, the collector electrode being connected through a resistor 67 to the base electrode of a conventional PNP transistor indicated generally at 68. The base electrode of transistor 68 is connected through a fixed resistor 69 to the emitter electrode of that transistor and to the movable contact of potentiometer 42. The collector electrode of transistor 68 is connected through fixed resistor 29 to the emitter electrode of UJT 25, the emitter-collector circuit of transistor 68 constituting the current supply for the timing circuit to trigger the UJT.

A conventional semiconductor diode 70 and a fixed resistor 71 are connected in series circuit relationship between the base electrode of transistor 65 and the movable contact of potentiometer 44 in the current signal voltage divider.

Transistors 65 and 68 and the associated circuit elements constitute the primary voltage and current control means for the UJT trigger circuit which, in turn, controls SCR 11. Transistor 68 can be referred to as the current control transistor because its primary function is to control the triggering of the SCR during the controlled current portions of the charging profile. Transistor 65 can be referred to as the voltage control transistor because its primary function is to control the voltage across the battery terminals during a different portion of the charging profile. This latter terminology is not totally accurate because both transistors are actually used in both current and voltage control. However, this terminology is convenient for discussion purposes.

It may be helpful in considering the operation of the apparatus to regard the circuit including transistors 65 and 68 as a form of NOR logic circuit, a connection of the two elements in series, one element (transistor 65) being responsive to battery voltage and the other (transistor 68) to charging current. The series connection is the base-emitter circuit of transistor 68 in series with the collector-emitter circuit of transistor 65. This circuit is an important part of the apparatus because it allows the three step, or three mode, control to operate without undesirable conflict between modes.

To discuss the operation of the above circuit, it will be convenient to refer to the current-voltage curve shown in FIG. 2 wherein the ordinate represents charging current supplied to the battery and the abcissa represents the terminal voltage of the battery. It will be assumed that the charging process commences with the battery largely discharged. In this case it is desirable to charge the battery at a relatively high current level and to continue the high current level until the battery terminal voltage has increased to some preselected point, the high current charging being represented by the portion of the curve in FIG. 2 indicated by the letters A-B. To prevent excessive gassing and to provide closer control at a voltage near the final voltage to which the battery is to be charged, the charging cycle is changed from the current control which existed in portion A-B to a voltage control wherein the charging current is allowed to vary but the terminal voltage of the battery is maintained relatively constant, this being illustrated by the region B-C. At point C the battery has nearly reached the desired terminal voltage and the control mode is again changed to current control, but this time at a substantially lower level than during the portion A-B.

It will also be noted that the portion B-C exhibits a slight "negative" slope wherein the voltage decreases slightly as current decreases under voltage control. This is simply due to charges in the operating points of the transistors in the circuit. No instability is introduced because the control is based on voltage and the current cannot jump between the double value points.

The low charging current control takes over rather abruptly when the charging current diminishes to the preselected level, and the low charging current is thereafter very closely controlled. It will be seen that the control during this portion of the charging cycle is similar to that during portion A-B but is actually more closely controlled because of the effective addition of another stage of gain in the control circuit. The low level charging current is allowed to flow until a preselected period of time has elapsed at which time the system is deenergized at point D. The timing function is commenced, in the embodiment disclosed in FIG. 1, at a current level within the voltage control region B-C which can be, for example, at point E. Thus, if a battery is connected to connectors 12 and 14 with a terminal voltage higher than the "flat" battery which was assumed to exist a point A, the system can adapt by providing high charging current for a relatively short time constituting only a portion of the A-B section at which time the charging mode becomes voltage controlled and the timing sequence begins. Portion A-B can, however, exist for as long as necessary to bring the battery or batteries up to a desired level of charge. This is especially advantageous if many batteries are to be connected in parallel wherein the high charging current level would be needed for a longer period of time than for a single battery being charged.

One would normally expect that to obtain control of the type described it would be necessary to provide separate controls and reference voltages and complicated interlocks to prevent the operation of one part of the control system from working against another portion of the circuit. This conflict is entirely avoided by the novel circuit described above.

A charging profile such as that shown in FIG. 2 can be attained with the apparatus of FIG. 1 as follows. Initially the current flow through conductors 19 and 20 is relatively large and the voltage produced by secondary winding 35 across series resistors 41–44 is similarly large. The center tap of winding 35 is maintained at the positive voltage level of the positive battery terminal and the voltage drop across the series circuit including the resistance elements of potentiometers 44 and 45 is relatively large, maintaining the anode electrodes of diodes 36 and 37 at a relatively large negative level compared to the positive battery terminal. The movable contact of potentiometer 45 is therefore also maintained at a negative level. The emitter electrode of transistor 47 is held at a relatively constant level by the regulating action of Zener diode 56, the value thereof being selected to keep the emitter electrode more positive than the base electrode. Transistor 47 and transistor 48 are therefore maintained in a substantially nonconducting condition throughout the high charge current portion of the cycle represented by the section A-B of FIG. 2.

However, as the charging current decreases to point E the potential at the movable contact of potentiometer 45 and, accordingly, at the base electrode of transistor 47 increases, rendering transistor 47 conductive and placing transistor 48 in a conductive state.

The circuit including transistors 47 and 48 is essentially a bistable circuit. When transistor 47 begins to conduct its emitter-collector current is amplified by transistor 48. The emitter-collector current of transistor 48 is fed through resistor 52 as positive feedback to transistor 47, driving it further into conduction. By this regenerative action the circuit is driven into the conductive state very quickly, resulting in a snap action which provides energizing current through resistor 50 to the energizing winding of relay 51, thus activating that relay. The movable contact of contact set 7 is then switched to the other position from that shown in FIG. 1, providing energizing voltage for timer motor 6 which commences the timing cycle to terminate at point D of FIG. 2.

While circuit 55 is relatively inactive during the high charging current portion of the cycle, transistors 65 and 68 are active. While high charging current flows, the voltage developed at the movable contact of potentiometer 42 is somewhat below the terminal voltage at connector 14. The emitter electrode of transistor 65 is held at a substantially constant level relative to connector 14 by Zener diode 56 in one leg of the bridge circuit, while the base electrode of transistor 65, through diode 64, responds to variations of voltage at the movable contact of potentiometer 62. The base voltage is of a comparable magnitude to the voltage of diode 56 and is determined by the resistors in the series voltage divider circuit constituting that portion of the bridge. The current flow through the emitter-collector circuit of transistor 65 is at full saturation level, resulting in very low emitter-collector voltage. Transistor 65 is effectively shorted out. The current through resistors 67 and 69 maintains the base electrode of transistor 68 at a slightly less positive level than the emitter electrode, permitting limited and controlled current flow through the emitter-collector circuit of transistor 68 to resistor 29 and to capacitor 31. As the charging current tends to increase the movable contact of potentiometer 42 becomes more negative, driving the emitter electrode of transistor 68 more negative and diminishing conduction, thereby providing decreased charging current through resistor 29 to capacitor 31. As will be apparent to those skilled in the art, the frequency with which UJT 25 is allowed to conduct depends upon the resistance value of resistor 29, the value of capacitor 31, the value of resistor 30, and the magnitude of the current provided through resistor 29 to charge the capacitor. The resistance and capacitor values are fixed, allowing complete control to be maintained by the current flow controlled by transistor 68. Thus, during the portion A-B of FIG. 2 transistor 68 maintains close control over the frequency of firing of UJT 25 and, consequently, of controlled rectifier 11. If the current tends to increase beyond the preselected safe level, the charging current is decreased, delaying the firing of UJT 25 and, therefore, of SCR 11. This automatically decreases the charging current to a desired level. It will be observed that the voltage control (transistor 65) is essentially calling for full current in an effort to take the voltage up to the voltage control point. However, the base-emitter circuit of transistor 68 senses current and, because of the series NOR circuit control, overrides the voltage sensing and provides current control.

When the battery terminal voltage increases sufficiently to commence the controlled voltage portion of the cycle, the voltage drop across the entire bridge circuit increases because the bridge circuit is directly tied to the battery terminals. The voltage drop across the voltage divider including resistors 60–63 causes the base electrode of transistor 65 to decrease, decreasing the conduction of transistor 65 and accordingly decreasing the base current of transistor 68.

This commences the voltage control portion of the cycle with transistor 65 sensing the variation across divider 60–63 at the movable contact of potentiometer 62 as compared with the reference voltage provided by diode 56. During this mode the emitter-base potential of transistor 68 is no longer controlling; instead, transistor 68 is controlled by its emitter-base current which is now controlled by transistor 65.

As battery voltage rises, transistor 65 is rendered less and less conductive, gradually reducing charging current. If this procedure were allowed to proceed unimpeded, the net effect would be to reduce to nothing the charging current at point C. However, a second current control comprising the series circuit including diode 70 and resistor 71 begins to conduct current when the charging current diminishes due to the increase of voltage at the movable contact of potentiometer 44. At low charging current levels this circuit maintains transistor 65 sufficiently conductive to provide a current to bias transistor 68 in a slightly conductive condition, maintaining a small charging current for capacitor 31 and, hence, relatively late trigger pulses from UJT 25 for controlled rectifier 11. This constitutes a third control circuit which maintains a charge current at a low, preset controlled level. The level of this "finish" charge current is substantially independent of line voltage variations or battery terminal voltage variations within the drive limitations of the charger. The control exercised during the finish charge period is similar to that of the high current control but at a lower level and with increased sensitivity. The increased sensitivity and improved control at the low level is due to the effective addition of transistor 65 as an additional stage of gain. During the high current portion, transistor 65 was in saturation and provided only a current path. However, in portion C-D, transistor 65 responds to base voltage changes and amplifies them, thus providing the additional gain.

Timer motor 6 is started by relay 51, as previously described, near the end of the controlled voltage portion of the cycle. Clearly, the circuit controlling relay 51 could be set to operate at any current level. However, to avoid early termination of the finish charge, the circuit is advantageously set to operate at a current level slightly greater than the finish charge current. The finish charge current control therefore provides a low charging current to battery 13 until timer motor 6 completes its cycle at which time the system is deactivated by opening switch 5. It is believed to be well understood in the art how the unijunction transistor and controlled rectifier circuit operate in providing activating pulses during the positive half-cycles of the supply voltage, rendering the controlled rectifier conductive for the remainder of each half-cycle. For a further discussion of this operation reference is made to the General Electric SCR Manual, 4th Edition, 1967, and especially to pages 76 and 163.

Zener diode 58 is included in the circuit to allow the SCR to turn off under certain operating conditions. Without diode 58, when the charger is connected to a "flat" battery, one which is completely discharged, the magnitude of the current carried by SCR 11 during each cycle of full-cycle conduction is so great that there is not enough time between the end of one conduction cycle and the beginning of the next for the carriers to recombine. The SCR can, under these conditions, lose control and remain in conduction, leading to destruction of the SCR and possible damage to other parts of the equipment. However, Zener diode 58 provides a low level cutoff to terminate conduction of the control circuit including transistors 65 and 68 and, hence, the SCR.

FIG. 3 shows a modified apparatus in accordance with the invention wherein the single controlled rectifier is replaced by two controlled rectifiers and other modifications are made accordingly. The use of two controlled rectifiers allows the use of smaller devices and improves the switching characteristics thereof.

The control circuit including transistors 47, 48, 65, and 68, and the associated circuitry is substantially the same as in FIG. 1 and the interconnections and operation thereof will not be described again in detail. It should be observed that Zener diode 58 of FIG. 1 no longer appears in the circuit of FIG. 3. This diode is no longer necessary since the controlled rectifiers in the embodiment of FIG. 3 no longer fire on every half cycle as was the case with the circuit of FIG. 1. The turn-off difficulty encountered with the single controlled rectifier is thereby eliminated. It will also be observed that the circuit of FIG. 3 includes a capacitor 75 connected in parallel circuit relationship with resistor 32. This addition is included because of the phase shift introduced by the addition of a pulse transformer, to be described.

The main charging circuit of the apparatus of FIG. 3 can be traced from the secondary winding of power transformer 80 which is equivalent to transformer 4 of the circuit of FIG. 1. The secondary winding of transformer 80 includes a center tap 81 which is connected to the positive terminal of a battery 82 to be charged. The negative battery terminal is connected to the anode electrodes of two similar controlled rectifiers 83 and 84. The cathode electrodes of rectifiers 83 and 84 are connected to the end terminals of the secondary winding of transformer 80, the conductors between the controlled rectifiers and the transformer passing through the core of a current transformer 79 which performs the same function as transformer 21 described with reference to FIG. 1. The control circuit is connected, as in FIG. 1, to the secondary winding of the current transformer and to the positive and negative battery terminals.

Diodes 85 and 86 are connected between the cathode electrodes of controlled rectifiers 83 and 84, respectively, and the primary winding of transformer 90. In effect, diodes 85 and 86 are in parallel with the controlled rectifiers to bypass power around the rectifiers to the trigger circuits from transformer 80. The gate electrode of rectifier 83 is connected to one terminal of a secondary winding 87 of a pulse transformer indicated generally at 90. The gate electrode of rectifier 84 is connected to a secondary winding 88 of transformer 90, the other terminals of the two secondary windings being connected to the cathode electrodes of the respective rectifiers. A primary winding 89 is connected between the base 1 electrode of a unijunction transistor 25 and ground. UJT 25 and the circuit for its control is the same as that described with reference to FIG. 1 except for the modifications discussed above.

It will be observed that the two controlled rectifiers 83 and 84 replace diodes 17 and 18 of FIG. 1 and also controlled rectifier 11 of FIG. 1. Pulse transformer 90 provides pulses to the gate electrodes of both controlled rectifiers on each half cycle of the energizing current, the time within each half cycle at which the trigger pulse is supplied being determined by the control circuit. However, only one of the controlled rectifiers conducts on each half cycle because the cathodes of the controlled rectifiers are provided with alternating current and, as is well understood in the art, the gate-cathode relationship is suitable for conduction by only one of the rectifiers at any given time.

While one advantageous embodiment has been chosen to illustrate the invention, it will be understood by those skilled in the art that various changes and modifications can be made therein without departing from the scope of the invention as defined in the appended claims.

What is claimed is:

1. A battery charging apparatus comprising the combination of
   first and second connector means connectable to the positive and negative terminals of a battery to be charged for conducting charging current to the battery;
   a source of AC power including
      a power transformer having a secondary winding with a center tap and two end terminals;
      a full wave rectifier;
   circuit means for connecting said source of AC power to said full wave rectifier;
      said circuit means including first and second conductors, one end of each conductor being connected to one end terminal of said secondary winding and the other end being connected to said rectifier;
   a semiconductor switching device connected to one of said connector means and to said AC source,
      said switch means having a control electrode and a switchable conductive path connected in series with the battery when the battery is connected to said connectors for controllably providing charging current to said battery;
   a current transformer having a magnetically permeable core inductively coupled to said circuit means,
      said current transformer having a secondary winding for providing a current representative of the magnitude of charging current in said circuit means,
      said first and second conductors being magnetically coupled to said core to constitute a primary winding,
      said conductors being coupled to said core in directions to produce a magnetomotive force suitable to provide in said secondary winding a reconstructed AC signal when the currents in said conductors are pulsating and unidirectional and separated in phase by 180°; and control circuit means connected to said secondary winding, to said first and second connector means and to said control electrode of said switching device for providing control signals to said switching device in response to terminal voltage of, and charging current to, the battery.

2. Apparatus according to claim 1 wherein said control circuit means comprises rectifier circuit means connected to said secondary winding of said current transformer for providing a rectified signal proportional in magnitude to the charging current flowing through said first and second conductors;

a voltage divider connected to said connector means in parallel circuit relationship with the battery being charged; and semiconductor circuit means connected to said rectifier circuit means and to an intermediate point on said voltage divider for providing a control current related to battery terminal voltage and to charging current; and gate circuit means responsive to said control current for providing spaced energizing signals to the control electrode of said semiconductor switching device.

3. A battery charging apparatus comprising the combination of first and second connector means connectable to the positive and negative terminals of a battery to be charged for conducting charging current to the battery;

a source of AC power;

a full wave rectifier;

circuit means for connecting said source of AC power to said full wave rectifier, said circuit means connecting said source of AC power to said full wave rectifier carries charging current to the battery and is coupled to said current transformer as a primary winding;

a semiconductor switching device connected to one of said connector means to said AC source, said switch means having a control electrode and a switchable conductive path connected in series with the battery when the battery is connected to said connectors for controllably providing charging current to said battery;

a current transformer inductively coupled to said circuit means, said current transformer having a secondary winding for providing a current proportional in magnitude of charging current in said circuit means; and control circuit means connected to said secondary winding, to said first and second connector means and to said control electrode of said switching device for providing control signals to said switching device in response to terminal voltage of, and charging current to, the battery, said control circuit means including means connected to said secondary winding for producing a unidirectional signal having a magnitude representative of the magnitude of the charging current, means connected to said connector means for producing a unidirectional signal representative of battery terminal voltage, means for producing a control current having a magnitude representative of the charging current when battery terminal voltage is less than a preselected value; and timing circuit means responsive to said control current for providing activating signals to said control electrode of said semiconductor switching device;

said timing circuit means comprising a unijunction transistor, a capacitor connected between the emitter electrode and one base electrode, and a resistor connected between said emitter electrode and said means for producing a control current, said resistor, capacitor and transistor forming a relaxation timing circuit.

4. A battery charging apparatus comprising the combination of a source of AC power, rectifier means for controlling the flow of pulsating unidirectional current;

connector means connectable to a battery to be charged for placing the battery in circuit relationship with said rectifier means;

conductor means for interconnecting said AC source, said connector means and said rectifier means in series circuit relationship;

a current transformer inductively coupled to said conductor means for developing an electrical signal representative of the maginitude of current flowing in said conductor means;

divider circuit means connected to said connector means for developing a signal representative of battery terminal voltage; and control circuit means connected to said current transformer, to said divider circuit means and to said rectifier means for providing spaced trigger pulses to said rectifier means in response to said electrical signals representative of current and battery terminal voltage to provide limited high charging current to said battery until the terminal voltage thereof reaches a preselected level, to provide an interval of controlled voltage charging current, and to provide a low charging current thereafter.

5. Apparatus according to claim 4 wherein said rectifier means comprises at least one thyristor connected in series circuit relationship with said AC source and said battery;

and said control circuit means comprises a trigger circuit for providing activating pulses to said at least one thyristor.

6. Apparatus according to claim 4 wherein said control circuit means comprises a Zener diode connected to said connector means to provide a reference voltage;

first transistor circuit means connected to said diode and to said divider circuit means for comparing battery terminal voltage with said reference and for developing said signal representative thereof; and second transistor circuit means connected to said first transistor circuit means and to said current transformer for developing a signal related to charging current;

said first transistor circuit means being effective to inhibit operation of said second transistor circuit means when said battery terminal voltage reaches a preselected level.

7. Apparatus according to claim 6 wherein said rectifier means comprises
at least one thyristor connected in series relationship with said AC source and said battery; and said control circuit means comprises
a trigger circuit for providing activating pulses to said at least one thyristor.

* * * * *